Jan. 12, 1960   J. S. GELLATLY ET AL   2,921,177
LOW VOLTAGE PERCUSSION WELDING APPARATUS
Filed June 27, 1957   4 Sheets-Sheet 1
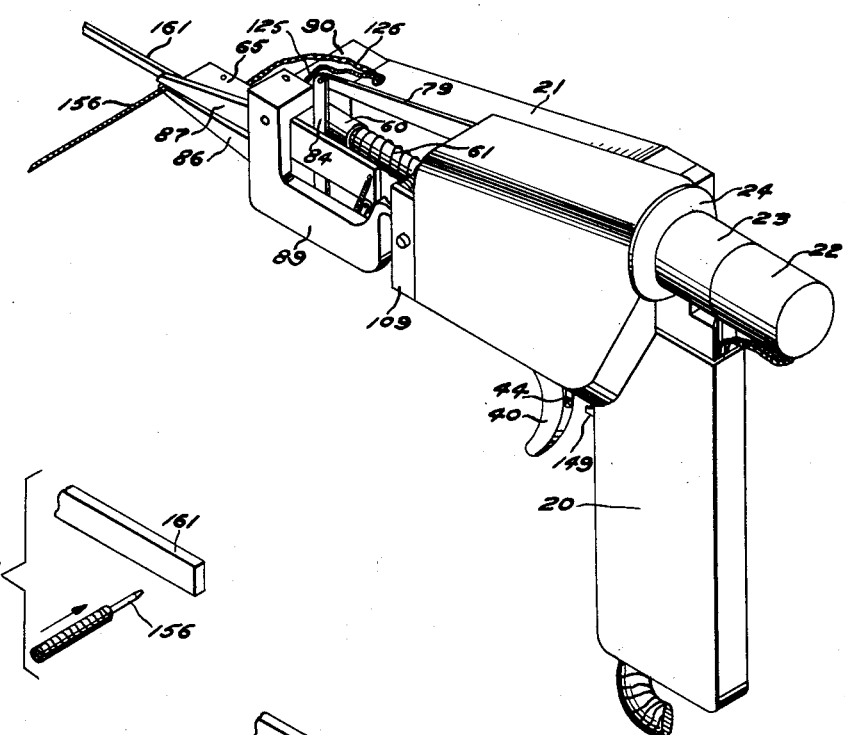
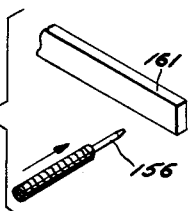
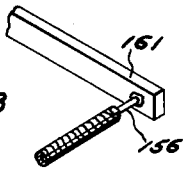
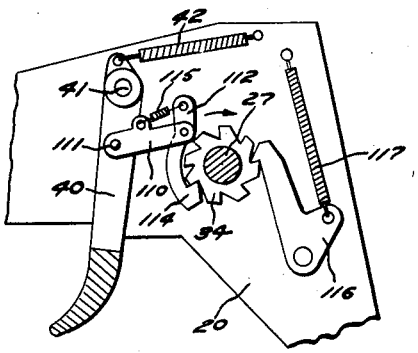
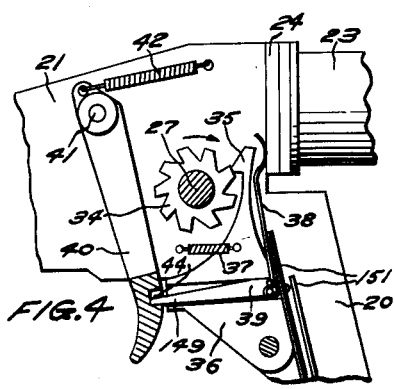
INVENTORS
J.S. GELLATLY
J.R. JOHNSON
A.L. QUINLAN
BY R.P. Miller
ATTORNEY Jan. 12, 1960 J. S. GELLATLY ET AL 2,921,177
LOW VOLTAGE PERCUSSION WELDING APPARATUS
Filed June 27, 1957 4 Sheets-Sheet 2

INVENTORS
J. S. GELLATLY
J. R. JOHNSON
A. L. QUINLAN
BY R. P. Miller
ATTORNEY

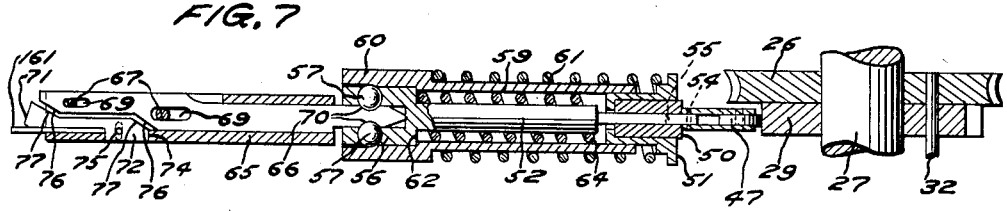
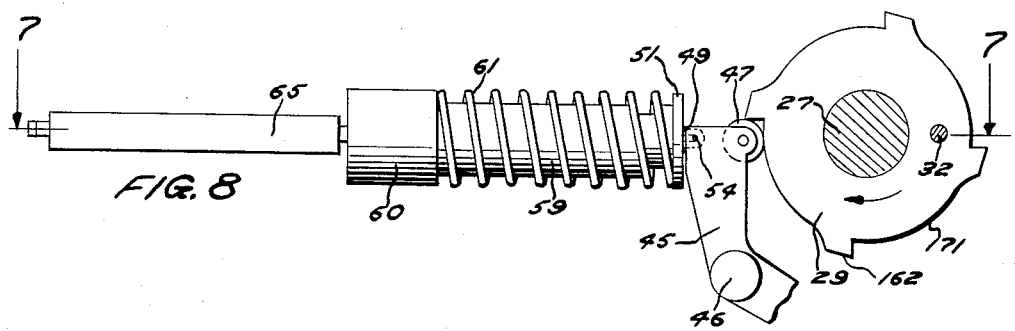
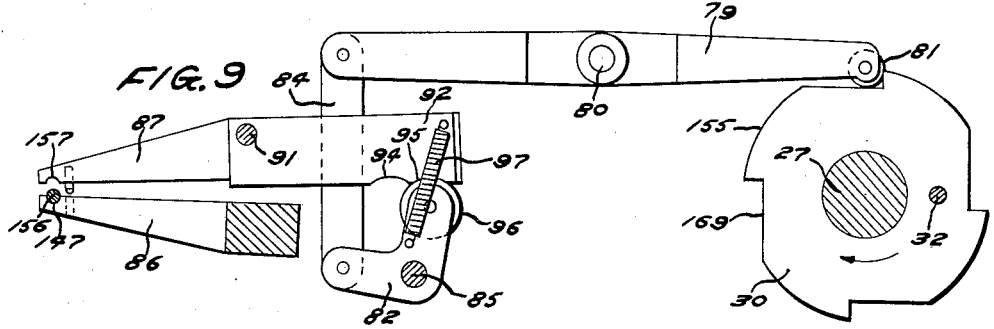
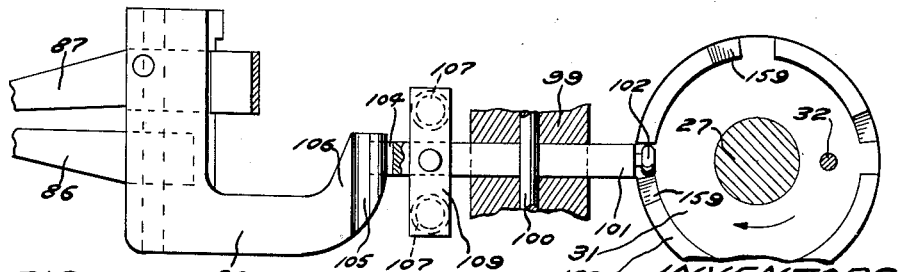

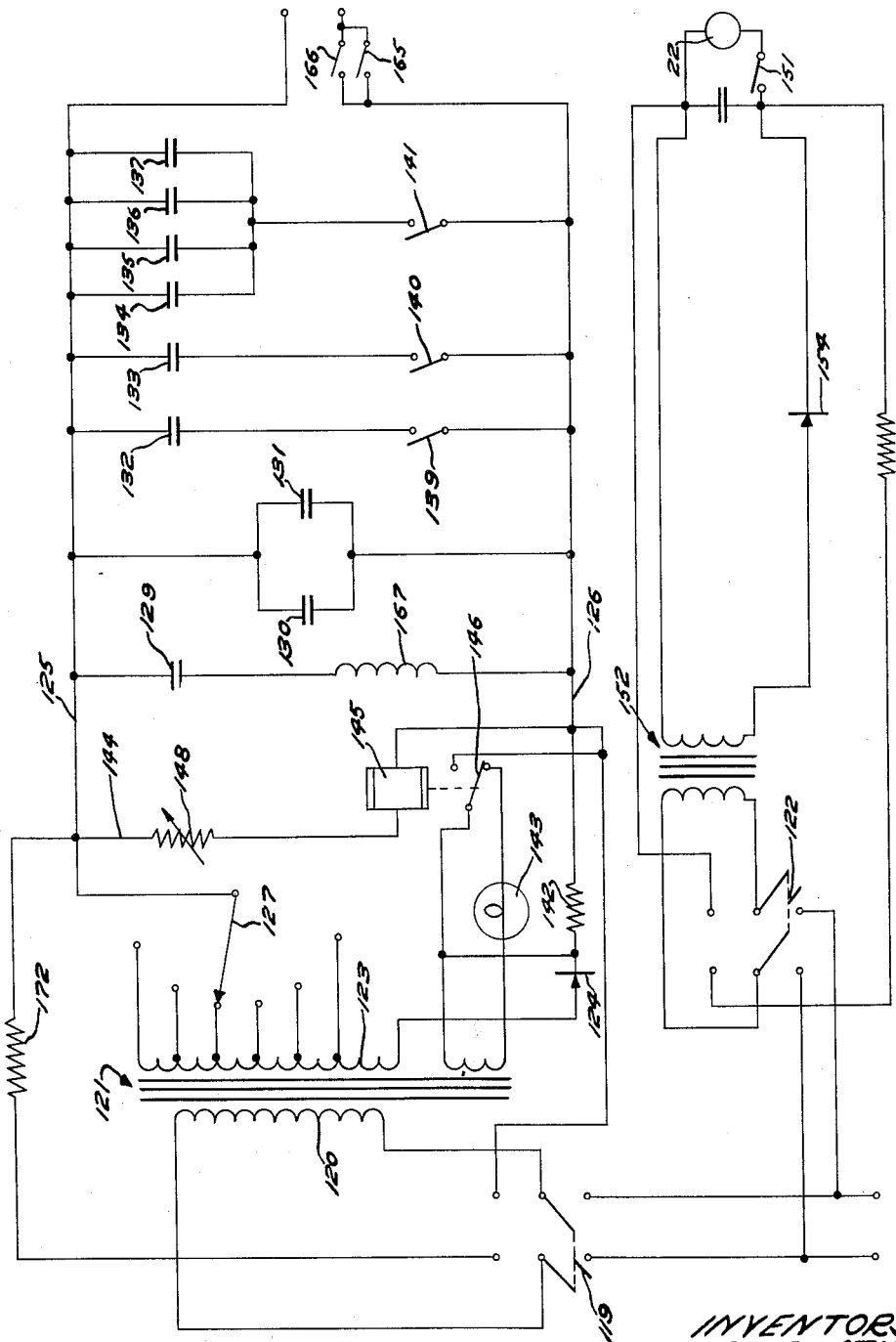

Patented Jan. 12, 1960

2,921,177

LOW VOLTAGE PERCUSSION WELDING APPARATUS

John S. Gellatly, La Grange Park, Joel R. Johnson, Chicago, and Amos L. Quinlan, La Grange Park, Ill., assignors to Western Electric Company, Incorporated, New York, N.Y., a corporation of New York Application June 27, 1957, Serial No. 668,350

8 Claims. (Cl. 219—95)

This invention relates to percussion welding apparatus and more particularly to an automatic percussion welding gun for establishing electrical connections between wires and terminal members.

This invention is an improvement of the hand-operated percussion welding gun disclosed and claimed in the co-pending application of A. L. Quinlan, Serial No. 668,173, filed June 26, 1957, now Patent No. 2,878,362. The welding gun disclosed in the above application, while successful, required the operator to manipulate several thumb levers each time a weld was to be made.

It is therefore a primary object of this invention to provide an automatic apparatus that will percussively weld electrical components together.

It is another object of this invention to provide an automatic percussion welding gun which utilizes a low non-lethal voltage.

It is a further object of this invention to provide an apparatus which will automatically grip a pair of articles to be welded together and then bring said articles into percussive engagement to effect a percussive weld by means of a low voltage applied thereacross.

It is still another object of this invention to provide a percussion welding apparatus which will automatically grip the members to be welded and then automatically release said members upon completion of the weld.

With these and other objects in view, the present invention contemplates a percussion welding apparatus wherein the two electrodes are formed of two pairs of article gripping jaws. A cocking mechanism is provided to position the movable electrode a predetermined distance away from the fixed electrode. A master cam shaft mounts control cams which actuate the two pairs of article gripping jaws and the cocking mechanism. An electric motor is provided to rotate the master cam shaft to actuate the article gripping jaws and release the cocking mechanism whereupon a resilient means drives the movable electrode rapidly toward the fixed electrode to bring the articles gripped therein into percussive engagement. The cam shaft also mounts means for connecting a low voltage high current source across the two pairs of relatively moving article gripping jaws to effectuate a percussive weld. An alternative embodiment provides a ratchet and pawl mechanism which may be manually actuated in order to rotate the master cam shaft.

Other objects, advantages and novel features of the invention will become apparent upon consideration of the following detailed description in conjunction with the accompanying drawings, wherein:

Fig. 1 is a perspective view of an automatic percussion welding gun embodying the principal features of the invention;

Figs. 2 and 3 are perspective views illustrating the manner in which a wire is moved relative to a terminal in order to effectuate a percussive weld;

Fig. 4 is a fragmentary side elevation view of the gun shown in Fig. 1 and illustrates the mechanism utilized to energize the drive motor to obtain a predetermined amount of rotation of the cam shaft;

Fig. 7 is a full section taken along the line 7—7 of Fig. 8;

Fig. 8 is a side elevation view of the terminal gripping mechanism taken along the line 8—8 of Fig. 5;

Fig. 9 is a sectional view taken along the line 9—9 of Fig. 5 and illustrates the mechanism for actuating the wire clamping jaws;

Fig. 10 is a side elevation view looking along the line 10—10 of Fig. 5 and illustrates the mechanism which cocks the wire gripping jaws away from the terminal gripping jaws;

Fig. 12 is a fragmentary side elevation view similar to Fig. 9 and illustrates an alternative embodiment of the invention wherein a manually operable ratchet and pawl mechanism is utlized to rotate the master cam shaft; and Fig. 13 is a schematic wiring diagram of the welding and motor circuits utilized in the present invention.

Figure 5:
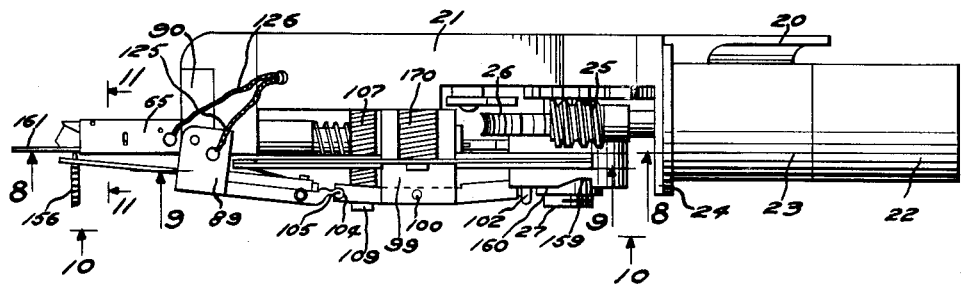
Fig. 5 is a top plan view of the percussion welding gun with a wire and a terminal gripped therein in position to be welded.

Attention now is directed to the drawings, and in particular to Fig. 1, wherein is disclosed a preferred embodiment of the present invention. The welding gun is formed of a handle 20 having a projecting portion 21 thereon; both being formed of an insulating material such as phenol fiber. A drive motor 22 is secured to the projecting portion 21 by means of a flange 24 projecting therefrom. The shaft of the motor 22 is connected to a worm 25 (Fig. 5) through a reduction gearbox 23. The worm 25 is in mesh with a wheel 26 keyed to a cam shaft 27. The cam shaft 27 mounts terminal clamping, wire clamping and cocking cams 29, 30 and 31 (Figs. 8, 9 and 10 respectively). The cams 29, 30 and 31 are fixed in position relative to the wheel 26 by means of a pin 32 passing therethrough.

The cam shaft 27 also mounts a ratchet 34 (Fig. 4) which is likewise fixed in position relative to the wheel 26. A pawl 35 carried by a pivoted sector arm 36 is normally held in engagement with the ratchet 34 by means of a spring 37. A leaf spring 38 bears against the flange 24 and is secured to a motor contact actuator 39 which is positioned within a slot formed in the sector arm 36.

A trigger 40 is pivotally mounted on the projecting portion 21 by means of a pivot pin 41. A tension spring 42, fixed to the trigger 40 and projecting portion 21, normally urges the trigger to rotate in a clockwise direction, as viewed in Fig. 4. The trigger 40 is provided with a recess 44 which is adapted to receive the exposed extremity of the contact actuator 39.

*Terminal clamping mechanism*

Referring now to Figs. 7 and 8, there can be seen the terminal clamping mechanism and the means by which it is actuated. A pivot arm 45 mounted on a shaft 46 carries a cam follower roller 47 in rolling contact with the periphery of the terminal clamping cam 29. A surface 49 of the pivot arm 45 bears against a bushing 50 which is positioned within an aperture formed in a bearing collar 51. A push rod 52 is connected to the pivot arm 45 by means of a pin 54 positioned within a slot 55 formed in the rearward extremity of the push rod 52.

The push rod 52 is provided with an enlarged socket portion 56 on the opposite extremity thereof. A pair of cam retaining spheres 57 are positioned within a pair of apertures formed in the walls of the socket portion 56. A sphere retaining sleeve 59 surrounds the push rod 52 and is provided with a counterbored enlargement 60 which surrounds the socket 56 and retains the spheres 57 within their respective receiving apertures. A compression spring 61 is interposed between the bearing collar 51 and the enlargement 60 and normally urges an internal shoulder of the enlargement 60 against a shoulder 62 formed by the socket 56. A second compression spring 64 is interposed between the socket 56 and bearing collar 55 to normally urge the bearing collar 55 and bushing 54 into engagement with the pivot arm 45 in order to maintain the roller 47 in contact with the cam 29.

Figure 11:
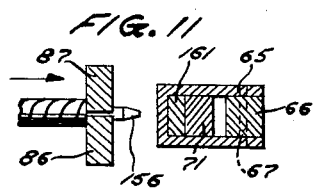
Fig. 11 is an enlarged sectional view taken along the line 11—11 of Fig. 5 and illustrates a wire and a terminal gripped in their respective gripping jaws.

A terminal positioning member 65 is secured to the projecting portion 21 (Fig. 5) and has a terminal clamping cam 66 slidable therein. The terminal positioning member 65 is U-shaped in cross section (Fig. 11) and is provided with pins 67 (Fig. 7) which are positioned within slots 69 in the terminal clamping cam 66. These pins 67 serve to limit and guide the movement of the cam 66 within the positioning member 65. The cam 66 is provided with indentations 70 which are adapted to receive the spheres 57 to connect the push rod 52 with the cam 66. A terminal clamping member 71 is also positioned within the positioning member 65 and is provided with a lug 72 slidable in an aperture 74 formed in the member 65. A pin 75 is provided to limit the vertical movement (as viewed in Fig. 7) and preclude horizontal movement of the clamping member 71 within the positioning member 65. The cam 66 is provided with camming surfaces 76 which are adapted to engage camming surfaces 77 on the clamping member 71 to effect movement thereof.

Wire clamping mechanism

A rocker arm 79 (Fig. 9) is pivotally mounted on a shaft 80 which is fixed to the projecting portion 21 and carries a cam follower roller 81 which is in rolling contact with the wire clamping cam 30. The other extremity of the rocker arm 79 is connected to a bell crank 82 by means of a connecting rod 84. The bell crank pivots about a shaft 85 which is fixed to the projecting portion 21.

Figure 6:
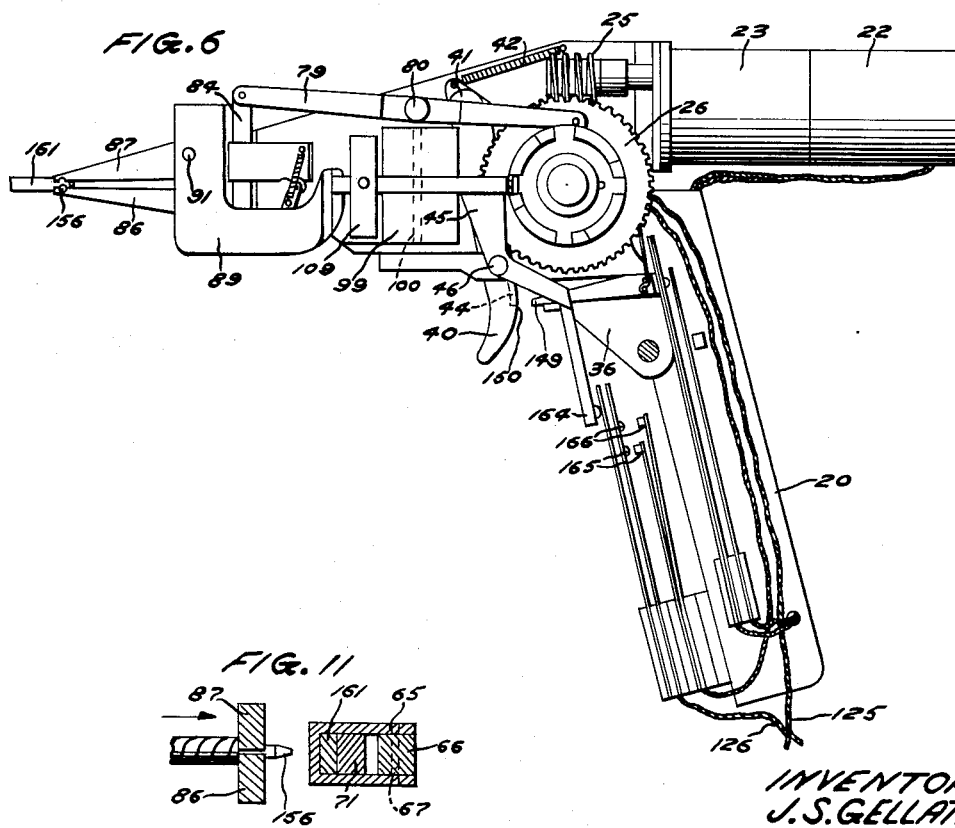
Fig. 6 is a side elevation view of the automatic percussion welding gun illustrating the mechanism for opening and closing the motor and welding circuits.

A pair of wire clamping jaws 86, 87 are mounted on a pivot block 89 (Figs. 1, 5 and 6) which in turn is pivotally mounted on an extremity 90 of the projecting portion 21. The jaw 86 is rigidly secured to the pivot block 89 and the jaw 87 is pivotally mounted thereon by means of a shaft 91. A rearward extremity 92 of the movable jaw 87 is provided with a pair of indentations 94 and 95 which are adapted to receive a roller 96 carried by the bell crank 82. A tension spring 97 is connected to the bell crank 82 and the extremity 92 of the jaw 87 to hold the roller 96 firmly within one of the indentations 94 or 95.

Cocking mechanism

A support block 99 (Fig. 10) is secured to the projecting portion 21 and carries a pivot shaft 100 secured thereto. A cocking lever 101 is pivotally mounted on the shaft 100 and carries a cam follower 102 in rolling contact with the radial face of the cocking cam 31 which is of the face cam type. The opposite extremity of the the cocking lever 101 is provided with an open cylindrical socket 104 (Fig. 5) which is adapted to receive a cylindrical projection 105 formed on an extremity 106 of the pivot block 89 to form a hinge-type connection therebetween. A pair of compression springs 107 are interposed between the projecting portion 21 and a spring bracket 109 secured to the cocking lever 101 to hold the cam follower 102 in contact with the cocking cam 31.

Alternative drive mechanism

Referring now to Fig. 12, there can be seen an alternative mechanism for imparting rotation to the cam shaft 27 through the ratchet 34. In this embodiment a link 110 is pivotally secured to the trigger 40 by means of a pivot pin 111. The link 110 pivotally mounts a second link 112 on the free extremity thereof. The link 112 is provided with a projection 114 which is adapted to engage successive teeth on the ratchet 34 to impart rotative movement thereto. A tension spring 115 interconnects the links 110 and 112 and normally urges the projection 114 into engagement with the ratchet 24. A pawl 116 and a tension spring 117 are provided to prevent retrograde movement of the cam shaft 27.

Operation

In order that a better understanding of the invention may be had, its mode of operation will now be described. To prepare the device for operation, a power switch 119 (Fig. 13) is closed to connect the 115 volt A.C. power supply to a primary winding 120 of a transformer 121. A second power switch 122 is closed to connect the A.C. power line to a motor transformer 152. The current induced in the secondary winding 123 of the transformer 121 is rectified by means of a rectifier 124 and the resulting potential is applied across lines 125 and 126. The secondary winding 123 is provided with a plurality of taps and a selector 127 to permit variation in the potential applied across the lines 125 and 126. Capacitors 129, 130 and 131 immediately begin charging and the remaining capacitors 132 to 137, inclusive, may or may not begin charging, depending upon the positions of switches 139, 140 and 141. This configuration of capacitors and switches permits the value of the combined capacitance to be varied.

At the beginning of the charging cycle, the full secondary voltage of the transformer 121 is not applied to the lines 125 and 126 due to the voltage drop across a resistor 142 which is included in series with the rectifier 124. When the capacitors first begin charging, the voltage thereacross will be quite small. As the capacitors approach a full charge for the particular voltage applied, the voltage applied to line 144, which includes a relay 145, will increase correspondingly. The increase in voltage across line 144 soon reaches a value sufficient to energize the coil of the relay 145 which is connected in the line 144. A variable resistor 148 is included in the line 144 to permit adjustment of the voltage value necessary to operate the relay 145. Upon energization, relay 145 closes normally open contacts 146 to shunt out the resistor 142. This eliminates the voltage drop across the resistor 142 and the capacitors then continue charging at a more rapid rate until a charge has been achieved which corresponds to the peak secondary voltage of the transformer 121. A pilot light 143 is connected to the normally closed contacts of the relay 145 to indicate whether or not the resistor 142 is shunted.

As was previously indicated, the projecting portion 21 is formed of an insulating material. The terminal clamping members 65 and 71 and the wire clamping members 86 and 87, to which the lines 125 and 126 are electrically connected, are mounted on the projecting portion 21 in such a manner that they are electrically insulated from each other. This configuration prevents a discharge of the capacitors at this time.

The operator next takes a length of wire which has previously been skinned a predetermined length and places the skinned portion of the wire in a notch 147 (Fig. 9) formed in a fixed jaw 86, so that the insulation remaining on the wire abuts the outer surface of the jaw 86. The trigger 40 is then pulled back toward the handle 20. As the trigger approaches its rearward position, an extremity 149 (Figs. 4 and 6) of the contact actuator 39 engages the back surface 150 of the trigger at a point just beneath the recess 44. Continued movement of the trigger then causes the contact actuator 39 to slide to the right (Figs. 4 and 6) against the urging of the leaf spring 38. This causes the rearward extremity of the contact actuator 39 to close a pair of normally open contacts 151 (Fig. 13). Closure of contacts 151 connects the drive motor 22 to the secondary winding of the transformer 152. The output of the transformer 152 is rectified by a rectifier 154 and is applied to the drive motor 22 which then begins to rotate.

Rotation of the armature of the motor 22 effects rotation of the cam shaft 27 through the worm 25 and wheel 26 in the direction indicated by the arrows in the various views. As the shaft 27 begins to rotate, the pawl 35 (Fig. 4) rides up the sloping surface of the adjacent tooth on the ratchet 34. This movement of the pawl 35 causes the sector arm 36 to rotate in a clockwise direction, as viewed in Fig. 4. Rotation of the sector arm 36 lifts the extremity 149 of the contact actuator 39 into registry with the recess 44; at which time the projection 149 slides into the recess 44 under the urging of the leaf spring 38. This movement retracts the rearward extremity of the contact actuator 39 from engagement with motor contacts 151. The motor contacts, however, remain closed since they are now held closed by the rearward surface of the sector arm 36. The shaft 27 continues to rotate through an angle of 45°, at which time the pawl 35 drops into the space formed between the next two ratchet teeth. When the sector arm has rotated back to its starting position, under the influence of the tension spring 37, the motor contacts 151 are again open, thereby stopping the rotation of the motor 22.

Rotation of the shaft 27 to an angle of 45° causes the cam follower roller 81 (Fig. 9) to ride up onto a peak 155 formed on the wire clamping cam 30. This movement causes counterclockwise rotation of the bell crank 82 through the rocker arm 79 and connecting rod 84. Movement of the bell crank 82 causes the roller 96 to roll out of the indentation 95 and into the smaller indentation 94. This causes the rearward extremity 92 of the wire clamping jaw 87 to be raised and thus clamps the wire 156 between a notch 147 in the jaw 86 and a notch 157 in the jaw 87.

The 45° rotation of the shaft 27 has also caused the cam follower 102 to ride up out of a recess 159 (Fig. 5) formed in the radial face of the cam 31 and onto a peak 160. This movement of the cam follower 102 has caused the cocking lever 101 to rotate about the pivot shaft 100 in a clockwise direction, as viewed in Fig. 5, to compress the springs 107 between the spring bracket 109 and the projecting portion 21 of the handle 20. This movement, through the cylindrical socket 104 and projection 105, has also caused the pivot block 89 to rotate in a counterclockwise direction, as viewed in Fig. 5, and thus retract the clamping jaws 86 and 87 from the terminal positioning member 65. The wire 156 is thus positioned a predetermined distance away from the member 65.

The gun is then manually manipulated to insert a terminal 161 (Fig. 7) between the short wall of the member 65 and the terminal clamping member 71. The trigger 40 is again pulled toward the handle 20 to cause the motor 22 to rotate the cam shaft 27 through a second 45° angle in the manner previously described. During the first 45° of rotation the cam follower 47 rolls on a portion of uniform radius on the cam 29 (Fig. 8) and thus the terminal clamping mechanism remains inactive. During the second 45° of rotation, however, the follower 47 rides up onto a peak 162 formed on a cam 29. This causes the pivot arm 45 to rotate about the shaft 46. The motion of the upper extremity of the pivot arm 45 is transmitted through the pin 54 and push rod 52 to the terminal clamping cam 66. As the cam 66 moves to the left (Fig. 7), the camming surfaces 76 engage the camming surfaces 77 on the clamping member 71 which moves the clamping member toward the wall of the positioning member 65. This causes the terminal 161 to be firmly gripped between the members 65 and 71.

As the pivot arm 45 rotates under the influence of the cam 29, a lower extremity 164 thereof (Fig. 6) closes contacts 165 and 166 to apply the potential on the lines 125 and 126 across the wire clamping jaws and the terminal positioning member. The contacts 165 are made of carbon and are adapted to close first and open last to preclude any arcing between the contacts which would be likely to weld the contacts together rather than the articles to be welded.

Immediately subsequent to the closing of the contacts 165 and 166, the cam shaft 27 nears the completion of its second 45° of rotation and the cam follower 102 abruptly drops into the next recess 159 on the cam 31. This permits the compression springs 107 to rapidly rotate the wire clamping jaws 86 and 87 and the wire 156 gripped therein toward the terminal positioning member 65 and the terminal 161. As the wire 156 nears the terminal 161, an arc will be drawn therebetween as the capacitors 129 to 137, inclusive, discharge. An inductor 167 is connected in series with the capacitor 129 to slightly retard the discharge of this capacitor. As a result of the inclusion of this inductor in the welding circuit, the flow of discharge current is insured for a slightly longer period of time and thus assures the application of sufficient heat to form a proper weld.

Since the voltage used in practicing the present invention is approximately 50 volts, it has been found necessary to form a somewhat pointed tip on the wire in order that a proper arc may be drawn. The tip resulting from cutting the wire with a pair of diagonal cutters has been found to give excellent results. The arc which is drawn just prior to impact serves to melt the tip of the wire and a small localized area on the terminal. Upon impact, these softened portions fuse together and the weld is thus effected. The cam 31 is so designed that the wire and terminal are impacted just prior to the completion of the second 45° of rotation of the cam shaft 27.

As the cam shaft 27 comes to a stop for the second time, the cam follower 81 falls from the high point of the surface 155 onto the lower surface 169 under the influence of a torque spring 170 (Fig. 5) which is provided to hold the cam follower 81 in contact with the periphery of the cam 30. This causes the wire clamping jaws 86 and 87 to open and release the wire 156. Also, upon completion of the movement of the shaft 27, the cam follower 47 falls from the peak 162 to a low surface 171 on the cam 29. This permits the compression spring 61 to move the bearing collar 55 to the right (Fig. 7) and thus retract the push rod 52 and terminal clamping cam 66 to release the terminal 161. The welded wire and terminal may then be removed from the gun and the entire process repeated. When the welding operations have been completed, the power switch 119 is thrown so its other position. This permits any charge retained in the capacitors 129 to 137, inclusive, to be discharged through a resistor 172 and the primary winding 120 of the transformer 121 to eliminate a safety hazard.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A percussive welding gun comprising a frame, a first normally open gripping means pivotally mounted on said frame, a second normally open gripping means fixed to said frame, means for moving said first gripping means toward said second gripping means, and means for sequentially closing said first and second gripping means and then actuating said moving means to move said closed first gripping means toward said closed second gripping means.

2. An automatic hand tool for percussively welding articles together comprising a handle, a first means movably mounted on said handle for gripping a first article, a second means fixed to said handle for gripping a second article, a third means for moving said first means toward said second means, cam means on said handle for actuating said first, second and third means, and drive means for operating said cam means to sequentially actuate said first, second and third means.

3. An automatic hand tool for percussively welding wires to terminal members comprising a handle, first means for gripping a wire movably mounted on said handle, second means for gripping a terminal member fixed to said handle, resilient means for urging said first means toward said second means, cam means for actuating said first and second means and for retracting said first means against the urging of said resilient means, and drive means for operating said cam means to sequentially actuate said first and second means and said resilient means to bring the wire and the terminal into percussive engagement.

4. An automatic hand tool for percussively welding wires to terminal members comprising a handle, wire gripping means movably mounted on said handle, first means for actuating said gripping means to grip a wire therein, a terminal positioning member secured to said handle, a terminal clamping member connected to said positioning member, second means for moving said clamping member toward said positioning member to grip a terminal therebetween, means for holding said gripping means a predetermined distance away from said positioning member, resilient means operable upon release of said holding means for moving said gripping means toward said positioning member to bring a wire and a terminal gripped therein into percussive engagement, and drive means including cam means for sequentially actuating said first and second means and releasing said holding means.

5. An automatic hand tool for percussively welding wires to terminal members comprising a handle, a pair of wire clamping jaws pivotally mounted on said handle, means including a first cam for actuating said clamping jaws, an apertured terminal receiving and positioning member secured to said handle, means including a second cam for clamping a terminal extremity within said positioning member, resilient means for moving said wire clamping jaws toward said terminal positioning member, means including a third cam for releasably holding said clamping jaws a predetermined distance from said terminal positioning member against the urging of said resilient means, and drive means for rotating said first, second and third cams to sequentially actuate said wire clamping jaws, said terminal clamping means and said holding means.

6. An apparatus for percussively welding articles together comprising a capacitor, a direct current source for charging said capacitor, a resistance in series with said capacitor and said direct current source, means operated by the capacitor accumulating a predetermined charge for shunting said resistance, a first electrode means for gripping a first article, a second electrode means for gripping a second article, means electrically insulating said first electrode from said second electrode, means connecting said capacitor across said first and second means, a third means for moving said first means toward said second means, and drive means including cam means for sequentially actuating said first, second and third means.

7. An automatic hand tool for percussively welding articles together comprising a capacitor, a direct current source, a resistance in series with said capacitor and said direct current source, means in parallel with said capacitor and operable upon the accumulation of a predetermined charge on said capacitor for shunting said resistance, means for adjusting the minimum operating voltage of said shunting means, a handle, first electrode means for gripping a first article movably mounted on said handle, second electrode means electrically insulated from said first electrode means for gripping a second article fixed to said handle, means for connecting said capacitor across said first and second electrode means, resilient means for urging said first electrode toward said second electrode, cam means for actuating said first and second electrode gripping means and for retracting said first electrode means against the urging of said resilient means, and drive means operable by said direct current source for operating said cam means to sequentially actuate said first and second electrode means and said resilient means to bring said first and second articles into percussive engagement whereby the resultant capacitor discharge effects a weld between said articles.

8. In a percussive welding gun, a frame, a first article gripping means mounted on the frame, a second article gripping means mounted on the frame for movement toward the first gripping means, a trigger mechanism, means operated by a first actuation of said trigger mechanism for operating said second gripping means to grip an article, and means operated by a succeeding operation of said trigger mechanism for sequentially operating said first gripping means to grip a second article and then percussively moving said second gripping means toward the first gripping means.

References Cited in the file of this patent

UNITED STATES PATENTS

| | | |
|---|---|---|
| 2,302,420 | Chapman | Nov. 17, 1942 |
| 2,384,014 | Cutter | Sept. 4, 1945 |
| 2,430,260 | Trott | Nov. 4, 1947 |
| 2,441,822 | Klemperer | May 18, 1948 |
| 2,442,609 | Levoy | June 1, 1948 |
| 2,455,526 | Sciaky | Dec. 7, 1948 |
| 2,467,379 | Graham | Apr. 19, 1949 |